United States Patent [19]

Maurer

[11] Patent Number: 4,748,452

[45] Date of Patent: May 31, 1988

[54] METHOD OF PRODUCING AN IDENTIFICATION CARD

[75] Inventor: Thomas Maurer, Munich, Fed. Rep. of Germany

[73] Assignee: GAO Gesellschaft fur Automation und Organisation mbH, Munich, Fed. Rep. of Germany

[21] Appl. No.: 843,617

[22] Filed: Mar. 25, 1986

Related U.S. Application Data

[62] Division of Ser. No. 602,079, Apr. 19, 1984, Pat. No. 4,597,593.

[30] Foreign Application Priority Data

Apr. 20, 1983 [DE] Fed. Rep. of Germany ....... 3314327

[51] Int. Cl.⁴ ...................... G01D 09/42; B42D 15/00

[52] U.S. Cl. .................................. 346/1.1; 346/76 L; 346/108; 383/86; 383/67

[58] Field of Search ...................... 346/1.1, 76 L, 108, 346/135.1; 283/85, 94, 107, 86, 67, 904

[56] References Cited

U.S. PATENT DOCUMENTS

| | | | |
|---|---|---|---|
| 3,015,267 | 1/1962 | Dashew | 101/369 |
| 4,006,050 | 2/1977 | Hurst | 156/234 |
| 4,360,728 | 11/1982 | Drexler | 346/76 L |
| 4,597,592 | 7/1986 | Maurer | 283/85 |

FOREIGN PATENT DOCUMENTS

| | | |
|---|---|---|
| 995274 | 8/1976 | Canada . |
| 2299972 | 3/1976 | France . |
| 2092519 | 8/1982 | United Kingdom . |
| 2044175 | 10/1982 | United Kingdom . |

*Primary Examiner*—E. A. Goldberg
*Assistant Examiner*—Mark Reinhart
*Attorney, Agent, or Firm*—Bacon & Thomas

[57] ABSTRACT

An identification card with high-embossed data, in which the high-embossed data are superimposed by a security pattern which is inscribed in the identification card by means of a laser beam recorder. The security pattern may be present, for example, only on the high-embossed data themselves or else cover a larger area of the card. Attempted back-embossing of the high-embossed data is immediately recognizable due to distortion of the security pattern.

6 Claims, 2 Drawing Sheets

METHOD OF PRODUCING AN IDENTIFICATION CARD

Figure 1:
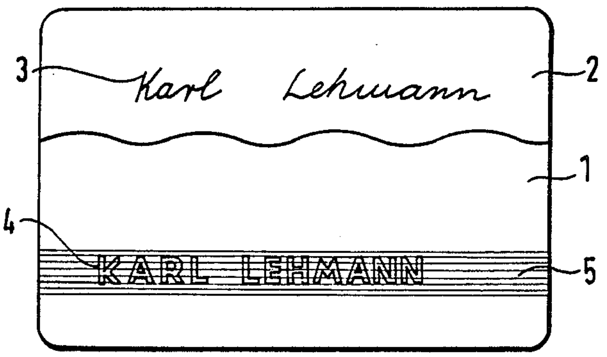

This application is a division of application Ser. No. 602,079, filed Apr. 19, 1984, now U.S. Pat. No. 4,597,593, issued July 1, 1986.

The present invention relates to an identification card with alphanumeric characters present in a high-embossed form capable of being used as a printing block, as well as a method of producing same.

It has been usual for some time to provide identification cards with high-embossed characters. In this way, the customer-related data, for example the name of the card owner, his account number, the card number, etc., are normally applied to the identification card.

The high-embossing of identification cards has proved particularly useful since the card personalization, i.e. the application of the customer's data, can be carried out on the completed laminated card after the reject cards due to deficient pressure and deficient lamination have already been eliminated. High-embossed data can be provided in virtually all types of cards regardless of the card construction. Because such cards act as a printing block in combination with an ink ribbon, they are used in a very simple manner for transferring the customer's data onto bills, etc.

However, it has proved to be particularly disadvantageous that the high-embossed characters can be removed even by extremely simple means by back-embossing or ironing, and then replaced by different high-embossed characters. Since the high-embossed characters give a card its individuality and are the only way of establishing a relation to the customer or the customer's account, it is clear that the customer's account must not be charged when these data have been secretly changed after the conclusion of a transaction. The damage caused by such manipulation always assumes large dimensions.

Since the use of high-embossed cards has now become customary in all areas of the economy and the advantages of quick data transmission without any elaborate aids cannot be provided by any other type of card, there have been attempts for years to find ways of allowing for the further use of high-embossing, on the one hand, and preventing manipulation or else making it recognizable to anyone without auxiliary means, on the other hand.

A great variety of proposals have been made in the course of time for solving this problem.

For example, the choice of bizarrely shaped special characters was to impede manipulatory re-embossing of the highembossed characters, since the usual press dies cannot be used for such cards. However, it turned out that it is possible to prepare any desired press die by simply casting the positive and negative reliefs of the identification cards, so that special characters could not prevent falsification of the cards.

It was also attempted to prevent back-embossing by filling synthetic material into the depressions on the back of the card resulting from the embossing. Since back-embossing is usually carried out on a heated card or, in the most simple case, with a hot iron, the filler mass was provided with heat indicators according to a further proposal which were intended to indicate the subsequent heating of the card additionally by an irreversible change of color.

Neither of these proposals was adopted in practice, since the filler material cannot be restricted to the depressions when applied subsequently and the materials applied in the surrounding area are very detrimental to the appearance of the back of the card. Furthermore, the subsequent filling in of the negative reliefs is very time-consuming, so that this measure is uneconomic especially for the production of a large number of cards.

In order to rule out the possibility of back-embossing from the start, a further method became known by which the personalization data, embossed in metal plates, are already transferred onto the card surface during lamination. During the laminating process the card material softens, flowing into the depressions in the metal plate without leaving a negative relief on the back. In this way high-embossing comes about without the possibility of subsequent back-embossing of the characters. Since a metal plate with engraved personalization data must be produced for each card to manufacture this type of card, however, this method did not find acceptance in practice either, for economic reasons.

It was further proposed as a way of preventing the falsification of data to personalize the finished laminated card by means of a laser beam recorder. In this way all types of cards can be provided with absolutely unfalsifiable data regardless of the card construction, and the characters may also exhibit relief-type surface deformation, but such cards are usually not suitable, as high-embossed cards are, for transferring card data onto other data carriers, so that the function of high-embossed cards cannot be taken over by laser-personalized cards.

The present invention is thus based on the problem of proposing an identification card with high-embossed data, in which means are provided for preventing both forgery and falsification of the card data, or rather for which such unlawful measures are recognizable without any auxiliary means, and for which the means of protection may be provided in an economical manner regardless of the card construction, even for mass production.

The invention is based on the finding that the high-embossed data, which are useless from a security point of view, in the personalized identification card should be protected, or rather their structural information should be additionally fixed in the card material, in such a way that any attempted forgery or falsification is immediately apparent visually without any auxiliary means. When the area of the high-embossed characters is superimposed by a security pattern inscribed in the card surface by a laser beam recorder and present in the form of a discoloration of the card material, attempted back-embossing is immediately visible to the naked eye since the security pattern is clearly less visible in the areas of the card material where the sides of the high-embossed characters were located, and is more or less distorted in these areas depending on the shape of the security pattern. Back-embossed characters are still clearly visible in the form of a structural or color change in the security pattern even in the case of expert falsification. In another embodiment, only the raised areas of the high-embossed characters are provided with a security pattern, so that the original information remains visible in the form of an interruption in the security pattern even after characters have been back-embossed.

The inscription of the security pattern by means of a laser beam recorder is particularly effective as protection against forgery and falsification since the security pattern is present in the form of a clearly visible discoloration in the card material caused by irreversible transformations in the card material, and is virtually impossible to forge. When the laser energy is applied in larger doses, there is not only discoloration but also a characteristic microrelief which is easy to check tactilely and provides additional protection against back-embossing of the characters.

An inventive identification card is also very easy to distinguish from a simulacrum counterfeit, in which a card blank is printed over with a security pattern and only then provided with embossed data, since the subsequent embossing greatly distorts the security pattern, thus making it deviate from the required appearance of its surroundings. In an inventive identification card, which is only provided with the security pattern after the data have been embossed, the security pattern is visible with virtually no distortion when observed perpendicularly.

As far as the form of the security pattern is concerned, different forms are conceivable and can be adapted as one chooses to the desired appearance of the card. Parallel straight or wavy lines, for example, are suitable, as well as the guilloches familiar in security printing technology and patterns constructed of microcharacters and possibly bearing, for instance, card-independent or card-individual information.

In the inventive method, the personalized identification cards are fed to the laser recording unit where the security pattern is inscribed by means of a laser beam recorder into the card material over the area of the embossed data. In a preferred arrangement, the ratio of distance between the laser beam recorder and the card plane is so great that the laser beam is always virtually perpendicular to the card plane, for example when inscribing a straight line pattern line by line. This avoids any "shadow effect", i.e. the shading off of card areas by the high-embossed characters. The laser energy hitting the sides of a high-embossed character is reflected for the most part, so that there is only very slight discoloration, if any, in these areas. Furthermore, the absorbed laser energy is distributed over a larger area, due to the slant of the sides, than in the case of a card area perpendicular to the laser beam. The resulting "stretching" of the part of the security pattern inscribed in this area is not visible when regarded perpendicularly, but becomes clearly revisible cognizable when the characters are back-embossed (an inscribed dot is stretched into an ellipse, for example).

In other embodiments of the inventive method, the position of the laser beam recorder with respect to the card plane is reduced and/or shifted in such a way that the above-mentioned "shadow effect" actually becomes visible. With respect to coordination with the design of the card as well as the form and appearance of the security pattern, the inventive method allows for all possibilities.

If a card-independent pattern, i.e. a pattern which is the same for all cards, is used as a security pattern, the laser apparatus and the writing process are particularly simple, since the same data record can be used for each card. There are thus no problems of assignment whatsoever between the identification card and the data record.

In order to attain a particularly high security standard, involving correspondingly higher expenditure, it is also possible to form the security pattern of user-related data ("microwriting" with the name of the card owner, account number, etc.). For this purpose, the corresponding data record for each personalized identification card must be fed to the laser unit. The most simple way of realizing this is to link the laser writing process directly with the personalization of the identification card. If the laser writing is carried out separately from the personalization of the identification card, the user-related, embossed data can, for example, also be read by an OCR reader and fed to the laser unit.

The use of the laser beam writing technique makes protection by means of a superimposed security pattern particularly unfalsifiable and easy to carry out on every identification card. The personalization and protection of the high-embossing can be done separately or in a self-contained process, as required.

A further advantage of the inventive method is that the protection of the high-embossed data consisting in the security pattern can be varied at will and can thus be adapted to the design of a specific type of card. Due to the optically recognizable, irreversible transformation of the material produced by the laser writing and extending into the interior of the card as well, manipulation or back-embossing and subsequent new embossing of characters is ruled out almost completely. In a special embodiment, the security pattern also exhibits a characteristic microrelief which allows for manual authenticity testing of the characteristic laser writing features in addition to the visual test.

With reference to the figures listed in the following, further embodiments of an inventive identification card and advantages of the inventive method shall be described in more detail.

Figure 2:
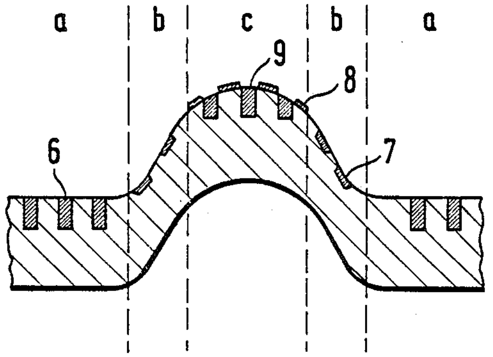
Figure 3A:
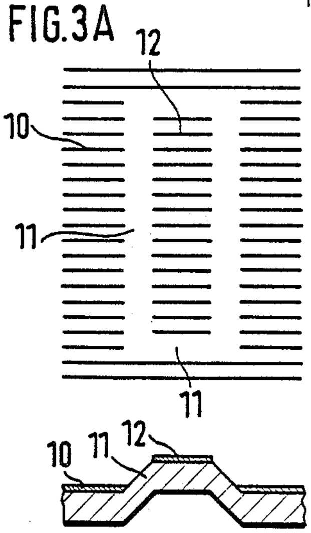
Figure 3B:
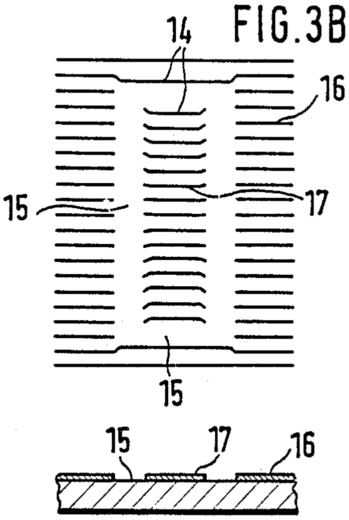
Figure 4A:
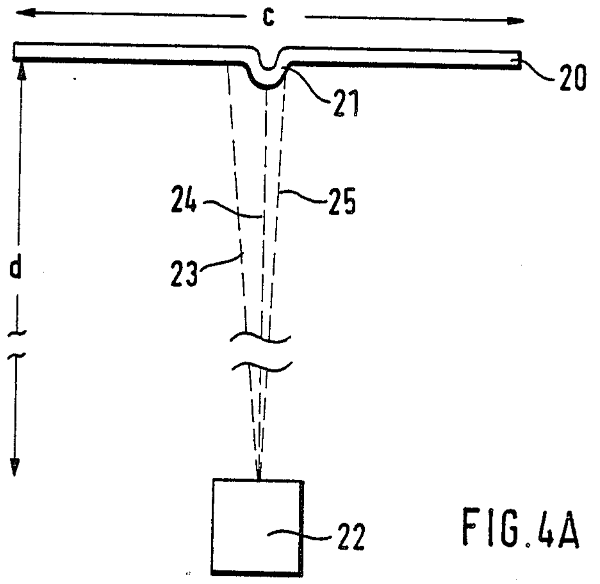
Figure 4B:
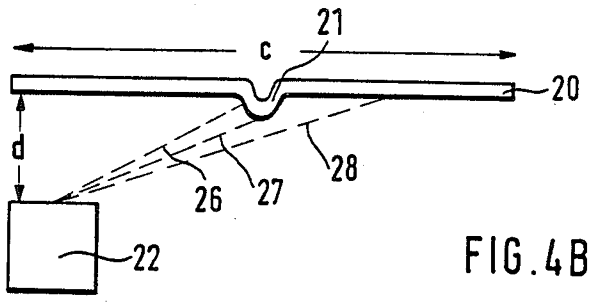

The figures show:

FIG. 1 an inventive identification card with high-embossed data and a superimposed security pattern FIG. 2 a schematically enlarged section of a high-embossed character in an inventive identification card FIG. 3A an enlarged high-embossed character with a superimposed security pattern consisting of lines FIG. 3B an enlarged back-embossed character with a superimposed security pattern consisting of lines FIG. 4A a writing arrangement for the inventive method with a perpendicular beam direction FIG. 4B a writing arrangement for the inventive method with a slanted beam direction FIG. 1 shows an identification card 1 from the top, on which the inventive protection is apparent.

Identification card 1 has in the upper card area a signature stripe 2 bearing signature 3 provided by the hand of the card owner. In the lower card area the name of the card owner appears in the form of high-embossed characters 4. These characters 4 are designed in such a way that they can be transferred onto other data carriers under the effect of pressure and in combination with an ink ribbon. Further high-embossed data 4 are usually provided on identification cards possibly stating the address of the card owner, his account number, the card number, etc. For the sake of simplicity, further characters are not shown; nor is a general printed pattern containing information on the issuing institute, etc., which is usually also provided.

High-embossed data 4, containing the information necessary for charging the account of the owner, are superimposed by large-area security pattern 5 which consists in this case of simple parallel lines. Security pattern 5 is inscribed by means of a laser beam recorder in the card already provided with embossed data 4.

Depending on the dosage of laser energy, the security pattern appears in the form of locally defined, irreversible discoloration resulting from transformations of the card material, or even in a clearly palpable microrelief.

FIG. 2 shows a greatly enlarged schematic section of a high-embossed character. The security pattern is present in the form of strong discoloration 6, 9 of the card material, and, on the sides of the character, as weak, barely visible discoloration 7. This effect must probably be explained by the fact that, when the beam direction of the laser beam recorder is virtually perpendicular to the card plane, the radiated laser energy is almost completely reflected in areas b of the high-embossed character, i.e. on the sides, so that there is only very slight discoloration 7 of the card material. In areas a and b, where the laser energy hits the card plane perpendicularly, it is absorbed for the most part by the card material, producing a clearly visible discoloration 6, 9. If the surface is covered by an ink layer as well to make the embossed data more recognizable—as is the case for conventional high-embossed cards—there is not only discoloration 9 in the card material, but also evaporation of the ink located on top of it, so that the security pattern is also visible on the surface of the high-embossed and impressed characters due to interruptions in the applied ink layer.

When the beam of the laser beam recorder is not perpendicular to the card plane, the side facing the laser beam recorder is also written on clearly, depending on the angle the beam forms with the card plane, while the side parts not facing the laser beam recorder are not written on since they are "in the shadow", so to speak. Thus, a "shadow effect" of more or less distinctness can be obtained depending on the position of the laser beam recorder.

FIGS. 3A and 3B show a schematic, greatly enlarged character (vertical stroke) from the top and in cross-section.

FIG. 3A shows the high-embossed character with a superimposed security pattern 10, 12 of straight parallel lines. When the beam of the laser beam recorder is virtually perpendicular to the card plane, the side parts of the character are not written on visibly, or are written on barely visibly, since the laser energy is reflected for the most part in this area. The security pattern then only appears on card plane 10 and on high-embossed area 12 of the character.

FIG. 3B shows the same character after back-embossing. Area 15, which formerly formed the sides of the high-embossed character, is not covered by the security pattern. The originally high-embossed character thus remains clearly visible even after back-embossing as an interruption in the security pattern, so that any attempted subsequent embossing of a different character is immediately recognizable. In the areas where the lines of the security pattern are virtually parallel to the sides of the character, lines 14 are distorted due to the back-embossing, which also makes an attempted falsification visible.

When the characters shown in FIG. 3A are regarded in the normal fashion, i.e. perpendicularly to the card surface, the security pattern appears to be very homogeneous due to its spatial distribution and due to shadow effects and reflections. In spite of the high-embossed sides having no, or only slight, writing on them, the observer does not recognize the light areas 11 shown in FIG. 3A. Under these circumstances no distortions of the printed pattern can be recognized whatsoever, either.

After the characters have been back-embossed, the parts of the security pattern which were formerly separated on the card surface 10 and apex planes 12 of the embossed characters are now arranged on the same plane. There are no more reflection or shadow effects. In this embodiment, side areas 15 devoid of writing are suddenly relatively distinct from their surroundings, appearing as light double lines, so that the original character remains visible unchanged.

The security pattern shown in FIG. 3A may also be of a much more complicated construction. It may consist, for example, of a series of characters ("microwriting") overlapping the area of the high-embossed characters. The characters may either bear card-independent information or user-related, card-individual information (e.g. the name of the card owner). The effect caused by back-embossing is analogous to that described for FIG. 3B.

FIGS. 4A and 4B show two schematic arrangements, not true to scale, for carrying out the inventive method.

FIG. 4A shows an identification card 20 with high-embossed characters 21 which has a security pattern written over it by laser beam recorder 22 in the area of the high-embossed characters. In this arrangement. the ratio of distance d (laser beam recorder to card surface) to card length c should be so large, when the card is stationary and the laser beam is deflected two-dimensionally, that beams 23, 24, 25 of the laser beam recorder hit the card plane virtually perpendicularly in all areas of the card. If the card is moved past the laser beam recorder during the writing process, the arrangement is dependent, of course, on the card distance in the case of perpendicular writing. While beams 23 and 24 hit areas of the card which are perpendicular to the laser beam and thus absorb the laser energy for the most part (here there is clearly visible discoloration of the card material), the energy of beam 25, which hits a side of high-embossed character 21, is reflected for the most part, so that here there is no, or only very weak, discoloration.

FIG. 4B shows an arrangement for achieving the above-mentioned "shadow effect". In this case the writing is carried out at an oblique angle. When the laser beam recorder is in this position, which is asymmetrical relative to the card plane (the laser beam recorder is in the left-hand card area), a "shadow" arises behind (relative to laser beam recorder 22) high-embossed characters 21 when the security pattern is being inscribed, i.e. the beams (e.g. beam 27) of the laser beam recorder do not reach this area since it is shielded from the beam area by high-embossed character 21. In this case the side of high-embossed character 21 facing the laser beam recorder is also written on (by beam 26).

By varying parameters c and d and the position of the laser beam recorder, the "shadow effects" can be varied in large areas.

The writing process is shown in such a way in the arrangements shown in FIGS. 4A and 4B that the positions of identification card 21 and of laser beam recorder 22 are stationary and only the beams scan the card surface. It is also possible, of course, as already indicated, to direct the identification card past the laser beam recorder, i.e. the identification card is moved while the laser beam remains stationary.

Summing up, high-embossed identification cards can be protected especially effectively against attempted forgery and falsification by the inventive method. One's freedom in selecting the security pattern, the great variability with respect to adaptation to a specific card design and the high protective value make the inventive method a particularly effective means of drastically reducing the damage caused annually by fraudulent card manipulation.

I claim:

1. A method for visibly encoding an indentification card having alphanumeric characters present in a high-embossed form capable of use as a printing block and intermediate areas of card material between the embossed areas and non-embossed areas at which the surface of the card is inclined with respect to the plane of the card, comprising the steps of:

(a) feeding the personalized card to a laser recording apparatus; and (b) encoding the card by inscribing a security pattern on at least a portion of the card material including the embossed characters in the form of, for example, lines, guilloches or characters, by means of the laser beam recorder such that the color of the card material is changed by the inscription and the security pattern extends over intermeidate and non-embossed areas of the card so that, when observed normally with respect to the card plane, the security pattern appears free of distortion.

2. A method as claimed in claim 1 wherein, in step (b), the beam of the laser recorder is directed perpendicular to the card plane during the inscribing process.

3. A method as claimed in claim 1 wherein, in step (b), the beam of the laser recorder is directed at an angle to the card plane during the inscribing process.

4. A method as claimed in claim 1 wherein, during the inscribing process, the beam of the laser recorder is moved and the card is stationary.

5. A method as claimed in claim 2 wherein, during the inscribing process, the beam of the laser recorder is moved and the card is stationary.

6. A method as claimed in claim 3 wherein, during the inscribing process, the beam of the laser recorder is moved and the card is stationary.

* * * * *